United States Patent
Kloosterboer et al.

(10) Patent No.: US 7,169,828 B2
(45) Date of Patent: *Jan. 30, 2007

(54) METHOD OF MANUFACTURING A REPLICA AS WELL AS A REPLICA OBTAINED BY CARRYING OUT AN UV LIGHT-INITIATED CATIONIC POLYMERIZATION

(75) Inventors: Johan George Kloosterboer, Eindhoven (NL); Fredericus Johannes Touwslager, Eindhoven (NL); Emile Johannes Karel Verstegen, Eindhoven (NL); Hendrik Roelof Stapert, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/500,767

(22) PCT Filed: Dec. 16, 2002

(86) PCT No.: PCT/IB02/05546

§ 371 (c)(1),
(2), (4) Date: Jul. 6, 2004

(87) PCT Pub. No.: WO03/057759

PCT Pub. Date: Jul. 17, 2003

(65) Prior Publication Data

US 2005/0082724 A1    Apr. 21, 2005

(30) Foreign Application Priority Data

Jan. 11, 2002    (NL)    ................................. 1019727

(51) Int. Cl.
C08F 2/46    (2006.01)
B29D 11/00   (2006.01)
G02B 1/00    (2006.01)
G02B 1/04    (2006.01)

(52) U.S. Cl. ....................... 522/170; 522/168; 522/167; 522/100; 264/1.1; 264/1.32; 264/1.34; 264/1.38; 264/1.36; 264/494; 264/496

(58) Field of Classification Search ................ 522/100, 522/168, 170; 264/1.32, 1.38, 1.7, 494, 496, 264/1.34, 1.36, 1.1; 428/1.2
See application file for complete search history.

(56) References Cited

U.S. PATENT DOCUMENTS

2002/0033547 A1 *  3/2002  Kloosterboer et al. ..... 264/1.32

FOREIGN PATENT DOCUMENTS

WO    WO980042497    * 10/1998

OTHER PUBLICATIONS

Encyclopedia of Polymer Science and Technology [online]. Copyright © 2004 by John Wiley & Sons, Inc. [retrieved on Jun. 9, 2006]. Telechelic Polymers [online]. Retrieved from Internet: <URL:http://www.mrw.interscience.wiley.com/epst/articles/pst499/sect9-fs.html>. Chapter 9: Ring Opening Polymerization, pp. 87-100.*

* cited by examiner

Primary Examiner—Sanza L. McClendon
(74) Attorney, Agent, or Firm—Michael E. Belk

(57) ABSTRACT

The invention relates to a method of manufacturing a replica, which method comprises the provision of a polymerizable resin composition between a front mold having a pre-shaped surface and a back mold having a pre-shaped surface, carrying out a curing treatment and removing the replica thus manufactured from the molds. The invention further relates to a replica obtained by carrying out a UV light-initiated cationic polymerization.

11 Claims, No Drawings

METHOD OF MANUFACTURING A REPLICA AS WELL AS A REPLICA OBTAINED BY CARRYING OUT AN UV LIGHT-INITIATED CATIONIC POLYMERIZATION

The invention relates to a method of manufacturing a replica, which method comprises the provision of a polymerizable resin between a front mold having a pre-shaped surface, and a back mold having a pre-shaped surface, carrying out a curing treatment and removing the replica thus manufactured from the molds, which replica comprises a solid body onto which the shape of the surface of the front mold and the shape of the surface of the back mold have been reproduced. The invention also relates to a replica obtained by carrying out a UV light-initiated cationic polymerization.

Such a method is known per se from U.S. Pat. No. 4,890,905, filed in the name of the current applicant. The replication process employs a mold or a matrix having an accurately defined surface which is the negative of the desired optical profile of the replica. In the exact determination of the definition of the surface of the mold or matrix, the shrinkage of the synthetic resin of the replica must be taken into account. A quantity of a liquid, curable synthetic resin composition is provided in the mold. The mold, comprising a front part and a back part, is closed, as a result of which the synthetic resin spreads between the pre-shaped surfaces of the mold parts. The synthetic resin mixture is cured and the replica is formed. Subsequently the replica is removed from the mold. The free surface of the synthetic resin replica is the negative of the corresponding surfaces of the mold parts. The advantage of the replication process is that optical components, such as lenses having a complicated refractive surface, for example an aspherical surface, can be manufactured in a comparatively simple manner without subjecting a substrate, e.g. glass, to complex polishing treatments for obtaining the desired surface shape. A drawback of such a replication by means of polymerization is the occurrence of shrinkage. Particularly if the flow of the bondable resin composition is impeded by gelation or a substantial increase in viscosity, further polymerization will lead to the development of stresses or even to premature delamination. If the product is subsequently removed from the mold, as in the case of, in particular, a replication process, only a partial relaxation of the stresses takes place, particularly if the product formed is composed of a densely cross-linked polymeric network. Such a bonded polymeric network is desired, however, for the cohesion of the product formed.

Therefore, it is an object of the invention to provide a polymerizable resin composition which, if it is cured against a mold, exhibits as little relaxation as possible after it has been removed from the mold and hence represents, as accurately as possible, the shape of the mold.

Another object of the invention is to provide a method of manufacturing a replica, which method employs a polymerizable resin composition which also features a high reaction rate and a reaction that can be controlled by UV radiation.

Still another object of the invention is to provide a method of manufacturing a replica in which method the polymerizable resin is substantially insensitive to oxygen during curing so that parts of the resin that are not fully enclosed by the mold are still curable in ambient air, thereby avoiding the need of blanketing said mold with an inert gas.

Yet another object of the invention is to provide a method of manufacturing a replica, which method employs a polymerizable resin composition, the final product of which corresponds to the currently applicable quality requirements regarding transparency and hardness.

A still further object of the invention is to provide a method of manufacturing a replica, wherein a polymerizable resin composition is employed whose viscosity is so low that it can be accurately dosed in the replica process without any problems.

The method mentioned in the opening paragraph is characterized in accordance with the invention in that the curing treatment is a UV light-initiated cationic polymerization, the resin composition used being a compound comprising at least two cationically polymerizable cyclic ether groups, which only shows signs of gelation when at least 30% of the conversion that can be achieved in the mold under the relevant curing conditions has taken place.

By using such a bondable resin composition, the final product will be substantially free of shrinkage stresses owing to the late gelation and comparatively small shrinkage. According to the applicant, the comparatively small degree of shrinkage can be attributed to the fact that the ring-opening process on which the current curing treatment is based does not cause a significant change of the number of chemical bonds, instead the number of bonds in the starting product and in the bonded product more or less correspond to each other, so that only a small degree of shrinkage takes place. Conversely, in the known (meth) acrylate compounds, as known from the above-mentioned U.S. Pat. No. 4,890,905, an increase in the number of chemical bonds is brought about, which explains the higher degree of shrinkage. In addition, in the compounds in accordance with the invention, gelation and vitrification do not occur until a high conversion percentage is reached, so that the development of stresses starts at a much later stage. According to the current applicants, this surprising effect is brought about by a surprisingly large degree of chain transfer, as a result of which, at the beginning of the bonding reaction, predominantly comparatively small molecules are formed which do not form a gel until a high conversion percentage is reached. If the method in accordance with the invention is applied to replicate aspherical lenses of, for example, CD players, the application of the bondable composition in accordance with the invention will cause the shape of the mold to correspond substantially exactly to the product finally formed, as a result of which a much smaller shrinkage correction is necessary. As, in addition, after the product has been removed from the mold, less relaxation is necessary, it is to be expected that the amount of spread in the shape of the replicated lenses will be much smaller in the above-mentioned production process. The method in accordance with the invention can particularly suitably be used to replicate relief structures requiring an accurate (sub-micron) shape reproduction.

Compounds which can suitably be used in the method in accordance with the invention to manufacture a replica include a bondable resin composition of the following general formula:

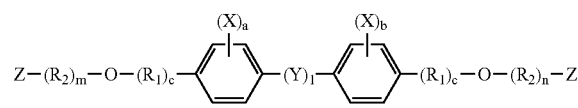

wherein:
Y=—O—, —SO₂—, —CH₂—, —C(CF₃)₂—, —C(CH₃)₂—, —C(=O)—, —O—C(=O)—, —O—C(=O)—O—,
X=a halogen or CH₃,
R₁=—CH₂—, —C(CH₃)₂—,
R₂=—OCH₂CH₂—, —OCCH₃HCH₂—, —OCH₂CCH₃H—, —OCH₂CHOHCH₂—,

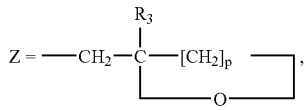

$R_3$=H, $C_nH_{2n+1}$,
n=an integer≧1,
p=1–4,
m, a, b, c are each individual integers in the range from 0–4.

For the bondable resin composition use can also suitably be made of a compound selected from the group formed by 1,2,7,8-diepoxyoctane, 3,4-epoxycyclohexylmethyl-3',4'-epoxycyclohexanecarboxylate, bis(3,4-epoxycyclohexylmethyl)adipate, bis(3,4-epoxy-6-methylcyclohexylmethyl)adipate and $C_{12}$–$C_{14}$-alkylglycidylether and the corresponding oxetane compounds thereof. An oxetane compound which can particularly suitably be used is 1,4-bis[(3-ethyl-3-oxetanylmethoxy)methyl]benzene.

Dependent upon the viscosity of the selected bondable resin composition, it may be preferred, in certain embodiments, that the bondable resin composition additionally comprises a reactive diluent, which is preferably selected from the group formed by butylglycidylether, heptylglycidylether, octylglycidylether, allylglycidylether, p-t-butylphenylglycidylether, phenylglycidylether, cresylglycidylether, diglycidylether of 1,4-butanediol, diglycidylether of neopentylglycol, diglycidylether of polypropeneglycol, vinylcyclohexanedioxide, diglycidylether of recorcinol, diglycidylether of polypropeneglycol and diglycidylester of linoleic acid dimer and the corresponding oxetane compounds thereof.

The invention further relates to a replica obtained by carrying out a UV light-initiated cationic polymerization of a compound comprising at least two cationically polymerizable cyclic ether groups, which compound does not exhibit gelation until at least 30% of the conversion that can be achieved in the mold under the relevant curing conditions has taken place, if necessary in the presence of a reactive diluent.

A suitable replica is any relief structure requiring an accurate (sub-micron) reproduction. A further example of a suitable replica is an optical component, in particular an (a)spherical lens, a lens array, a prism, a grating or another relief structure for optical applications, or a combination thereof.

These and other aspects of the invention will be apparent from and elucidated with reference to the embodiment(s) described hereinafter.

COMPARATIVE EXAMPLE

An aspherical lens is manufactured by means of a commonly known photoreplication method by providing a reactive mixture comprising a monomer, a photoinitiator and, if necessary, a sensitizer into an aspherical mold and pressed such as to cause the liquid to spread between the pre-shaped surface of a front mold and the pre-shaped surface of a back mold without the inclusion of air bubbles. Subsequently, the reactive mixture is exposed to UV light passing through at least one of said front and back mold and originating from a high-pressure mercury lamp provided with filters transmitting only the spectral range from 320 to 390 nm. If necessary, the exposure process can be carried out such that the UV light passes through both the front mold and the back mold, provided both molds are embodied so as to be transparent. After the exposure process, the lens is removed from the molds and optically and mechanically examined.

The above-mentioned photoreplication method is carried out using a reactive mixture comprising a solution of 4% 2,2-dimethyloxy-1,2-diphenylethane-1-on in 2,2-bis(4-(2-methacryloxyeth-1-oxy)phenyl)propane. This mixture is exposed at room temperature for 7 seconds at an intensity of 40 mW/cm² and subsequently removed, whereafter it is re-exposed at 10 mW/cm² for 1 hour at room temperature and stabilized in the dark for 16 hours at 140° C. The lens thus obtained is optically and mechanically characterized.

During the polymerization process, the mixture exhibited approximately 7% shrinkage. Using such a reactive mixture, the aspherical mold must be corrected in an iterative process in order to obtain a lens of the desired shape.

EXAMPLE IN ACCORDANCE WITH THE INVENTION

The commonly known photoreplication method described in the comparative example hereinabove is used, except that the reactive mixture used is a solution of 4.75% diphenyliodoniumhexafluoroarsenate and 0.25% anthracene in 2,2-bis(4-(glycidyloxy)phenyl) propane. This mixture is subsequently exposed at room temperature for 7 seconds at an intensity of 100 mW/cm² and subsequently removed, whereafter it is re-exposed at 10 mW/cm² for 1 hour at room temperature, and stabilized in the dark at 110° C. for 8 hours. The lens thus obtained is optically and mechanically characterized.

During the polymerization process, the mixture exhibited approximately 2.3% shrinkage. Using such a reactive mixture comprising a compound including at least two cationically polymerizable cyclic ether groups, it is not, or hardly, necessary, unlike the reactive mixture used in the comparative example, to correct the aspherical mold in order to obtain a lens of the desired shape. This favorable result is attributed to the fact that after removal from the mold, hardly any relaxation occurs. This very small degree of relaxation, as compared to the reactive mixture used in the comparative example, can be attributed, according to the current applicants, to a combination of reduced shrinkage and retarded gelation.

The equipment for manufacturing the lenses should preferably include a provision for movement of at least one of the molds in the axial direction during the curing process as disclosed in U.S. Pat. No. 4,477,328 or a provision for replenishment of monomer during cure as disclosed in U.S. Pat. No. 4,812,346.

The invention claimed is:
1. A method of manufacturing a replica, which method comprises the provision of a polymerizable resin composition between a front mold having a pre-shaped surface, and a back mold having a pre-shaped surface, carrying out a curing treatment and removing the replica thus manufactured from the molds, which replica comprises a solid body onto which the shape of the surface of the front mold and the shape of the surface of the back mold have been reproduced, characterized in that the curing treatment is a UV-light initiated cationic polymerization, the resin composition used being a compound comprising at least two cationically polymerizable cyclic ether groups, which only shows signs of gelation when at least 30% of the conversion that can be achieved in the mold under the relevant curing conditions has taken place, wherein, the resin composition comprises a compound having the following general formula:

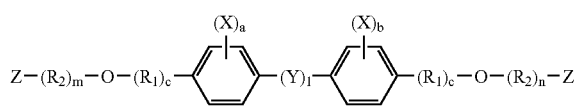

wherein:
$Y=$ —O—, —SO$_2$—, —CH$_2$—, —C(CF$_3$)$_2$—, —C(CH$_3$)$_2$—, —C(=O)—, —O—C(=O)—, —O—C(=O)—O—,
$X=$ a halogen or CH$_3$,
$R_1=$ —CH$_2$—, —C(CH$_3$)$_2$—,
$R_2=$ —OCH$_2$CH$_2$—, —OCCH$_3$HCH$_2$—, —OCH$_2$CCH$_3$H—, —OCH$_2$CHOHCH$_2$—,

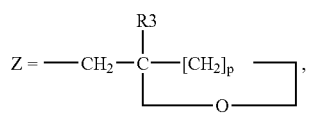

$R_3=$ H, $C_nH_{2n+1}$,
$n=$ an integer $\geq 1$.
$p=1$–4,
m, a, b, c are each individual integers in the range from 0–4.

2. A method as claimed in claim 1 characterized in that the compound is selected from the group consisting of 1,2,7,8-diepoxyoctane, 3,4-epoxycyclohexylmethyl-3',4'-epoxycyclohexanecarboxylate, bis(3,4-epoxycyclohexylmethyl)adipate, bis(3,4-epoxy-6-methylcyclohexylmethyl)adipate and $C_{12}$–$C_{14}$-alkylglycidylether and the corresponding oxetane compounds thereof, in particular 1,4-bis[(3-ethyl-3-oxetanylmethoxy)methyl]benzene.

3. A method of manufacturing a replica, which method comprises the provision of a polymerizable resin composition between a front mold having a pre-shaped surface, and a back mold having a pre-shaped surface, carrying out a curing treatment and removing the replica thus manufactured from the molds, which replica comprises a solid body onto which the shape of the surface of the front mold and the shape of the surface of the back mold have been reproduced, characterized in that the curing treatment is a UV-light initiated cationic polymerization, the resin composition used being a compound comprising at least two cationically polymerizable cyclic ether groups, which only shows signs of gelation when at least 30% of the conversion that can be achieved in the mold under the relevant curing conditions has taken place, and further characterized in that the resin composition further comprises a reactive diluent compound selected from the group consisting of butylglycidylether, heptylglycidylether, octylglycidylether, allylglycidylether, p-t-butylphenylglycidylether, phenylglycidylether, cresylglycidylether, diglycidylether of 1,4-butanediol, diglycidylether of neopentylglycol, diglycidylether of polypropeneglycol, vinylcyclohexanedioxide, diglycidylether of recorcinol, diglycidylether of polypropeneglycol and diglycidylester of linoleic acid dimer and the corresponding oxetane compounds thereof.

4. A replica obtained by carrying out a UV light-initiated cationic polymerization of a compound comprising at least two cationically polymerizable cyclic ether groups, which compound only exhibits gelation when at least 30% of the conversion that can be achieved in the mold under the relevant curing conditions has taken place, optionally in the presence of a reactive diluent, characterized in that the compound is selected from compounds having the following general formula:

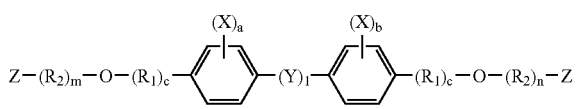

wherein:
$Y=$ —O—, —SO$_2$—, —CH$_2$—, —C(CF$_3$)$_2$—, —C(CH$_3$)$_2$—, —C(=O)—, —O—C(=O)—, —O—C(=O)—O—,
$X=$ a halogen or CH$_3$,
$R_1=$ —CH$_2$—, —C(CH$_3$)$_2$—,
$R_2=$ —OCH$_2$CH$_2$—, —OCCH$_3$HCH$_2$—, —OCH$_2$CCH$_3$H—, —OCH$_2$CHOHCH$_2$—,

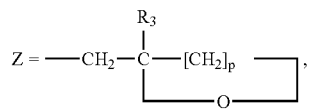

$R_3=$ H, $C_nH_{2n+1}$,
$n=$ an integer $\geq 1$.
$p=1$–4,
m, a, b, c are each individual integers in the range from 0–4.

5. A replica obtained by carrying out a UV light-initiated cationic polymerization of a compound comprising at least two cationically polymerizable cyclic ether groups, which compound only exhibits gelation when at least 30% of the conversion that can be achieved in the mold under the relevant curing conditions has taken place, optionally in the presence of a reactive diluent, characterized in that the reactive diluent is a compound selected from the group consisting of butylglycidylether, heptylglycidylether, octylglycidylether, allylglycidylether, p-t-butylphenylglycidylether, phenylglycidylether, cresylglycidylether, diglycidylether of 1,4-butanediol, diglycidylether of neopentylglycol, diglycidylether of polypropeneglycol, vinylcyclohexanedioxide, diglycidylether of recorcinol, diglycidylether of polypropeneglycol and diglycidylester of linoleic acid dimer and the corresponding oxetane compounds thereof.

6. A method of manufacturing a replica, which method comprises the provision of a polymerizable resin composition between a front mold having a pre-shaped surface, and a back mold having a pre-shaped surface, carrying out a curing treatment and removing the replica thus manufactured from the molds, which replica comprises a solid body onto which the shape of the surface of the front mold and the shape of the surface of the back mold have been reproduced, characterized in that the curing treatment is a UV-light initiated cationic polymerization, the resin composition used being a compound comprising at least two cationically polymerizable cyclic ether groups, which only shows signs of gelation when at least 30% of the conversion that can be achieved in the mold under the relevant curing conditions has taken place, optionally in the presence of a reactive diluent, wherein the polymerizable resin composition comprises a solution of about 4.75% diphenyliodoniumhexafluoroarsenate and about 0.25% anthracene in 2,2-bis(4-(glycidyloxy)phenyl) propane.

7. A method as claimed in claim 1, wherein the resin composition further comprises a reactive diluent selected from the group consisting of butylglycidylether. heptylglycidylether, octylglycidylether, allylglycidylether, p-t-butylphenylglycidylether, phenylglycidylether, cresylglycidylether, diglycidylether of 1,4-butanediol, diglycidylether of neopentylglycol, diglycidylether of polypropeneglycol, vinylcyclohexanedioxide, diglycidylether of recorcinol, diglycidylether of polypropeneglycol and diglycidylester of linoleic acid dimer and the corresponding oxetane compounds thereof.

8. A method as claimed in claim 2, wherein the resin composition further comprises a reactive diluent selected from the group consisting of butylglycidylether, heptylglycidylether, octylglycidylether, allylglycidylether, p-t-butylphenylglycidylether, phenylglycidylether, cresylglycidylether, diglycidylether of 1,4-butanediol, diglycidylether of neopentylglycol, diglycidylether of polypropeneglycol, vinylcyclohexanedioxide, diglycidylether of recorcinol, diglycidylether of polypropeneglycol and diglycidylester of linoleic acid dimer and the corresponding oxetane compounds thereof.

9. A replica obtained by carrying out a UV light-initiated cationic polymerization of solution of about 4.75% diphenyliodoniumhexafluoroarsenate and about 0.25% anthracene in a 2,2-bis(4-(glycidyloxy)phenyl) propane compound comprising at least two cationically polymerizable cyclic ether groups, which compound only exhibits gelation when at least 30% of the conversion that can be achieved in the mold under the relevant curing conditions has taken place, optionally in the presence of a reactive diluent.

10. A replica as claimed in claim 4, wherein the compound is selected from the group consisting of 1,2,7,8-diepoxyoctane, 3,4-epoxycyclohexylmethyl-3',4'-epoxycyclohexanecarboxylate, bis(3,4-epoxycyclohexylmethyl)adipate, bis (3,4-epoxy-6-methylcyclohexyl-methyl)adipate and $C_{12}$–$C_{14}$-alkylglycidylether and the corresponding oxetane compounds thereof, in particular 1,4-bis[(3-ethyl-3-oxetanylmethoxy)methyl ]benzene.

11. A replica as claimed in claim 10, wherein said compound is polymerized in the presence of a reactive diluent selected from the group consisting of butylglycidylether, heptylglycidylether, octylglycidylether, allylglycidylether, p-t-butylphenylglycidylether, phenylglycidylether, cresylglycidylether, diglycidylether of 1,4-butanediol, diglycidylether of neopentylglycol, diglycidylether of polypropeneglycol, vinylcyclohexanedioxide, diglycidylether of recorcinol, diglycidylether of polypropeneglycol and diglycidylester of linoleic acid dimer and the corresponding oxetane compounds thereof.

\* \* \* \* \*